May 17, 1927.
N. H. PREBLE
TRUCK CONVEYER
Filed July 9, 1923
1,628,909
2 Sheets-Sheet 1
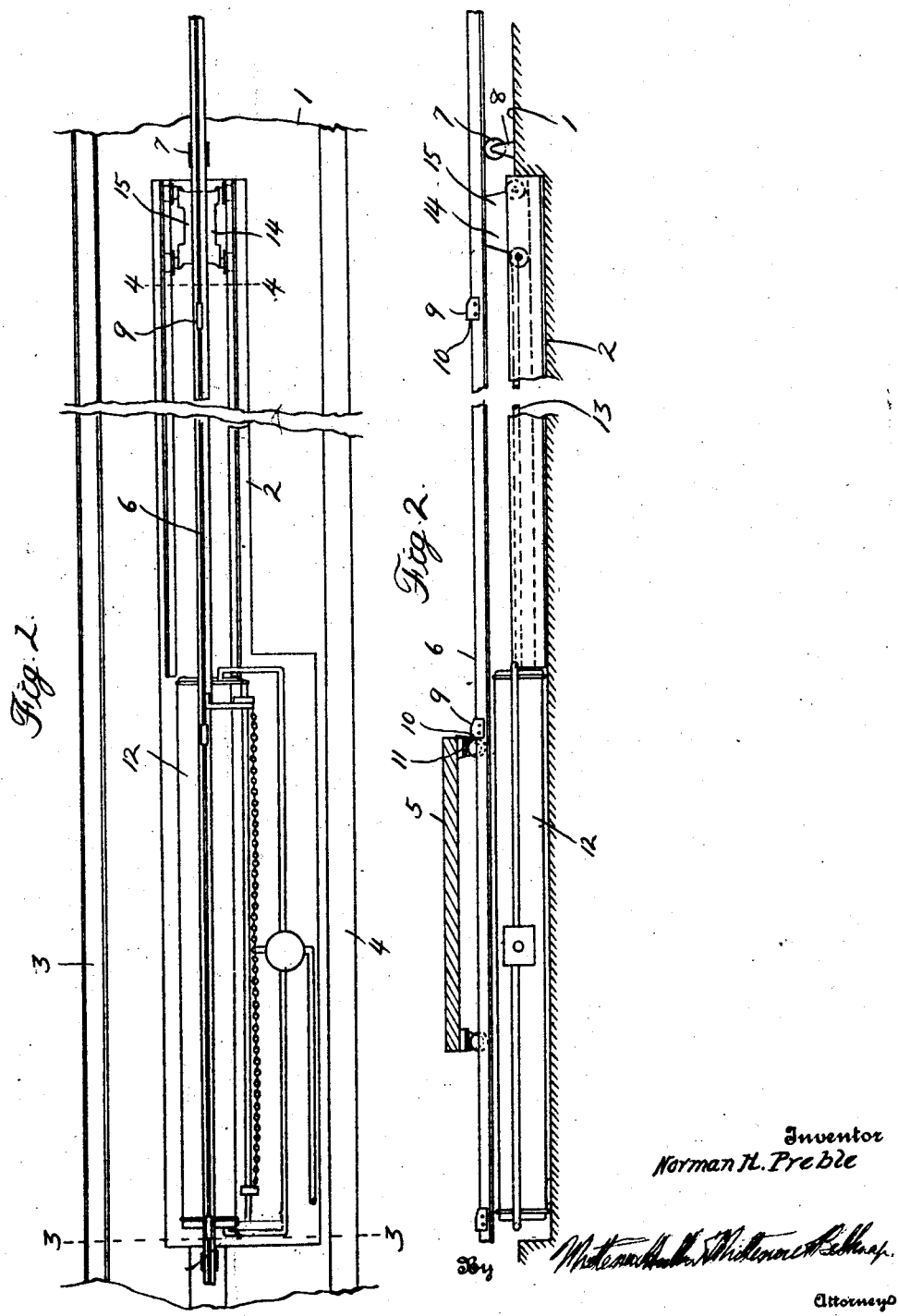
Inventor
Norman H. Preble May 17, 1927.

N. H. PREBLE 1,628,909

TRUCK CONVEYER

Filed July 9, 1923   2 Sheets-Sheet 2

Inventor
Norman H. Preble

Attorneys

Patented May 17, 1927.

1,628,909

UNITED STATES PATENT OFFICE.

NORMAN H. PREBLE, OF DETROIT, MICHIGAN, ASSIGNOR TO THE CECIL R. LAMBERT COMPANY, INC., OF DETROIT, MICHIGAN, A CORPORATION OF MICHIGAN.

TRUCK CONVEYER.

Application filed July 9, 1923. Serial No. 650,510.

The invention relates to conveyers and is particularly adapted for advancing vehicle bodies and the like through baking ovens or other treating chambers. The invention has for its object the provision of a conveyer which can be constructed at a comparatively low cost and which will extend above and below the floor a minimum distance. Another object is the provision of a conveyer having a longitudinally reciprocable truck actuating bar provided with driving members successively engageable with a truck for advancing the same, the adjacent driving members being spaced longitudinally of the bar a distance not more than that through which the driving members are moved. Further objects of the invention reside in the provision of guides for the reciprocable bar and in the novel features of construction and combinations and arrangements of parts as will be more fully hereinafter set forth.

In the drawings:

Figure 1 is a plan view of a conveyer embodying my invention;

Figure 2 is a side elevation thereof;

Figure 3:
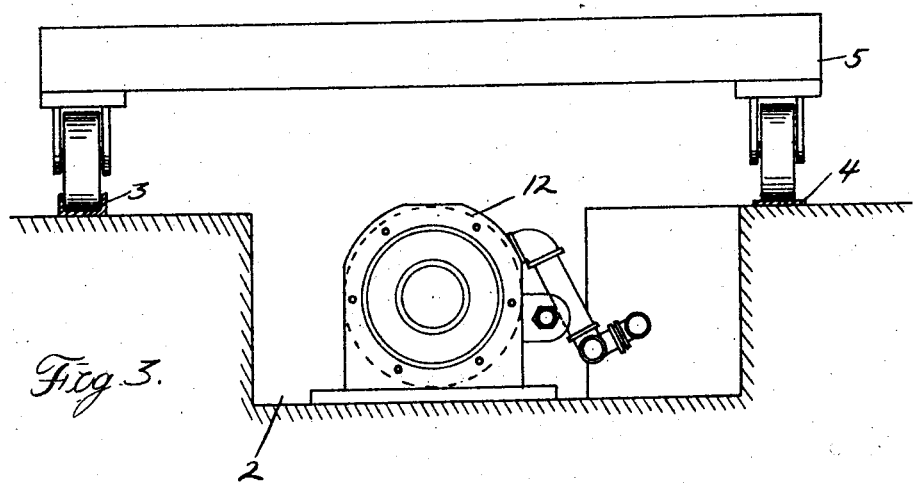
Figure 3 is an enlarged cross section on the line 3—3 of Figure 1.
Figure 4:
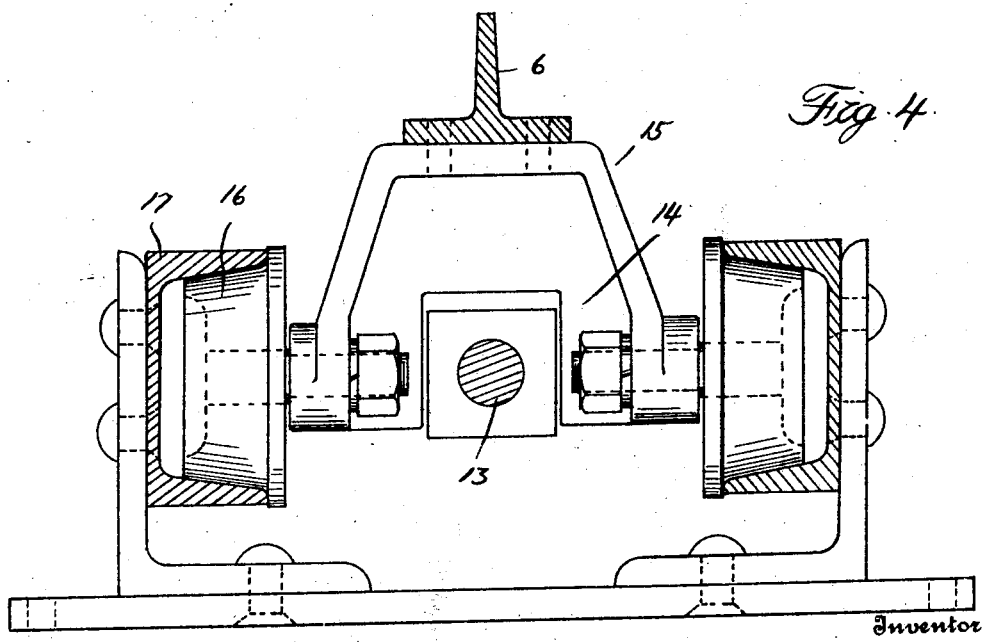
Figure 4 is an enlarged cross section on the line 4—4 of Figure 1.

1 is the floor having the recess or pocket 2 therein and also provided with a track which comprises the channel bar 3 and the parallel flat bar 4, these bars being engageable by the wheels of the truck 5 and supporting the same, the channel bar further guiding the truck.

6 is the truck actuating bar intermediate and extending parallel to the bars 3 and 4 of the track. This truck actuating bar is preferably of inverted T section and is supported upon and guided by the series of flanged rollers 7 journalled upon supports 8 resting on the floor. 9 are driving members embracing the web of the truck actuating bar and secured thereto, these driving members extending upwardly to form shoulders 10 engageable with the hinged member 11 depending from and pivotally secured to the platform of the truck, the hinged member being so pivoted that it will permit the driving members to return from their advanced positions to their starting positions. The adjacent driving members are spaced longitudinally of the bar a distance not more than that through which the driving members are moved, the arrangement being such that as the truck actuating bar is reciprocated, the driving members will successively engage a truck to intermittently advance the same. Furthermore, since there are a series of driving members upon the truck actuating bar, the distance between the end driving members is greater than the distance between the hinged members upon adjacent trucks so that a plurality of trucks may be advanced at the same time.

For longitudinally reciprocating the truck actuating bar, I have provided the double acting air hoist 12 provided with automatic return valves and speed control whereby the operation of the conveyer is automatic and the speed of the truck actuting bar is uniform under varying load. The hoist is located within the recess or pocket 2 of the floor and extends longitudinally of and below the truck actuating bar and has the piston rod 13 which is pivotally connected to the body 14 of the carriage 15, the truck actuating bar being secured to the upper face of the body to be moved therewith. The wheels 16 of the carriage are supported and guided by the parallel channel bars 17 located in the recess or pocket 2 of the floor, the arrangement being such that any downward load upon the truck actuating bar is prevented from affecting the piston rod of the hoist.

From the above description it will be readily seen that my conveyer is very simple and may be constructed at a comparatively low cost. Furthermore, that it extends a minimum distance above and below the floor.

What I claim as my invention is:

1. The combination with a longitudinally reciprocable bar, of rolls supporting said bar, members longitudinally spaced upon said bar for advancing a truck, power means connected to said bar for reciprocating the same and a wheeled carriage affording additional supporting means for said bar carried by the power means intermediate said rolls.

2. The combination with a track, of a longitudinally reciprocable bar extending substantially parallel to said track, a truck mounted upon said track and straddling said bar, a hinged driving member upon said truck, members longitudinally spaced upon said bar for separate engagement with said hinged driving member, and power means substantially below said rod and out of the path of travel of said truck of a carriage actuated by said power means and connected to said bar to reciprocate the same and a second track for guiding and supporting the carriage.

3. The combination with a track, of a truck mounted upon said track, power means for said truck, means for successively advancing said truck upon said track including a wheeled carriage carried by said power means, a reciprocable bar secured to said carriage, and members longitudinally spaced upon said bar for engaging said truck.

4. The combination with a track for guiding a truck, of an inverted T-shaped bar extending longitudinally parallel to said track, a series of rolls supporting said bar, members longitudinally spaced upon said bar for successively engaging a truck and advancing the same upon said track, power means located below and connected to said bar for longitudinally reciprocating the same, and a second track for guiding and supporting the bar at the point of contact with the said power means.

5. The combination with a longitudinally reciprocable bar, of driving members upon said bar for advancing a member, a wheeled carriage connected to said bar, a track for supporting said carriage, said track consisting of parallel channel bars, and a reciprocable piston rod located below said bar and connected to said carriage.

In testimony whereof I affix my signature.

NORMAN H. PREBLE.